June 17, 1958   F. W. SCHATZ ET AL   2,839,681
TIME RATE OF CHANGE OF RADAR RANGE VOLTAGE
Filed Nov. 23, 1953
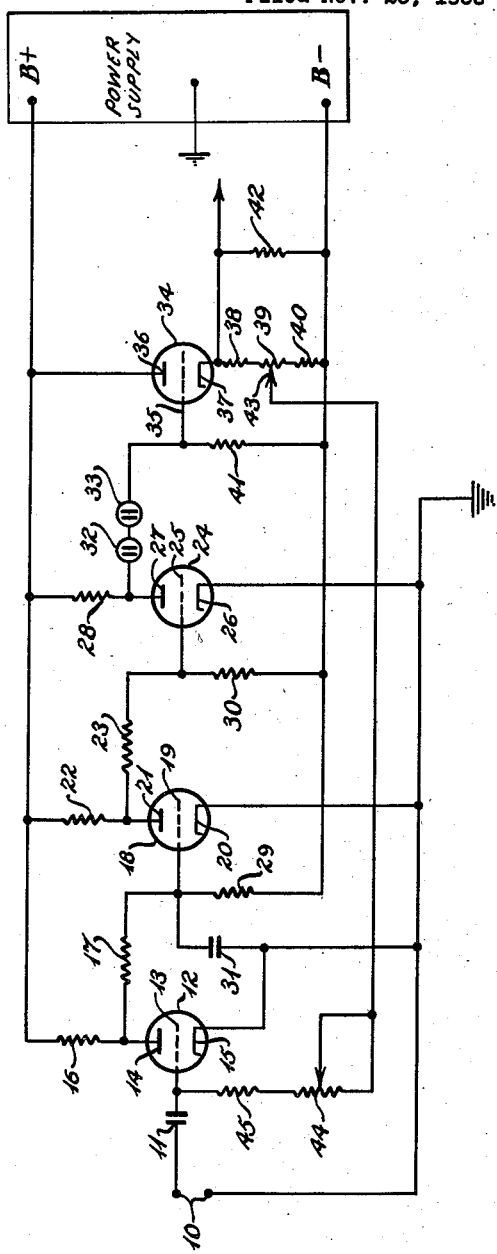
INVENTORS
Frederick W. Schatz
Frederick A. Reibert
BY
ATTORNEYS United States Patent Office 2,839,681
Patented June 17, 1958

2,839,681

TIME RATE OF CHANGE OF RADAR RANGE VOLTAGE

Frederick W. Schatz, Whitesboro, and Frederick A. Reibert, Syracuse, N. Y., assignors, by mesne assignments, to the United States of America as represented by the Secretary of the Navy Application November 23, 1953, Serial No. 393,971

1 Claim. (Cl. 250—27)

This invention relates to a system and apparatus for measuring the relative velocity of a moving target.

The circuit embodied in this invention finds particular utility along with many types of aircraft radar apparatus wherein it is desired to know the closing and opening speeds of a target. Generally, the circuit provides for a variable D. C. range signal which is obtained from a radar receiver and which is applied to the input of the circuit. Since the rate of change of range is velocity, the range signal is differentiated and amplified. A unique feedback system is employed for maintaining the voltage at the input constant, and for deriving a signal at the output circuit of a cathode follower which is proportional to opening or closing velocity.

It is an object of this invention to provide velocity voltage circuit which will provide an output voltage proportional to velocity and the response of which will be substantially linear.

Another object of this invention is the provision of a differentiating circuit having a range voltage input and having a cathode follower output and provided with a feedback circuit for maintaining the voltage at the input circuit constant, whereby a voltage proportional to velocity is produced.

Still other objects and advantages of this invention will become apparent upon consideration of the following detailed description and the appended claim, taken in connection with the single figure of the drawing in which a preferred embodiment of the invention has been shown.

Referring to the drawing, there is shown a pair of input terminals 10, to which a variable D. C. range signal is applied from a radar unit, or other range finding system (not shown). The signal is applied to the grid 13 of the triode amplifier 12 through a condenser 11, where the signal is differentiated. The triode 12 has a plate 14 which is connected to the B+ supply through a plate resistor 16, and a cathode 15 which is connected to ground. The voltage appearing at the plate 14 is applied through the resistor 17 to a second triode amplifier 18 at the grid 19. The cathode 20 of the triode 18 is grounded while the plate 21 is connected to the B+ supply through the plate resistor 22. Similarly, the output at plate 21 is applied through the resistor 23 to the triode 24 at grid 25. The cathode 26 is connected to ground, while the plate 27 is connected to the B+ supply through the plate resistor 28. Each of the triodes 18 and 24 is provided with grid bias resistors 29 and 30, respectively, each being connected between the grid 19 or 25 and the B+ supply. The triode 18 has also been provided with a grid leak condenser 31 connected between the grid 19 and ground.

The output from the triode 24 is applied from the plate 27 through a pair of series connected voltage regulator tubes 32 and 33 to the grid 35 of a cathode follower triode 34, having a plate 36 connected to the B+ supply, and having a cathode 37 connected to the B+ supply through the resistors 38, 39 and 40. The grid 35 is biased by a resistor 41. An output resistor 42 is connected in parallel with the resistors 38, 39 and 40.

A feedback variable tap 43 is connected from the resistor 39 of the cathode follower to the grid 13 of triode 12 through a speed calibrating resistor 44 and a grid resistor 45.

The operation of the circuit is as follows:

Range voltage, which is a variable direct current signal, the magnitude of which is proportional to range, is applied at the terminals 10. When the range voltage increases, there is a slight increase in the voltage at the grid 13 of the triode 12. An increase in grid voltage causes an increased current flow through the triode 12 and a decreased voltage at plate 14 which is applied to the grid 19 of triode 18. The decrease of voltage at the grid 19 results in an amplified increase at the plate 21, which is applied, in turn, to the grid 25 of the triode 24. In a similar manner, the voltage at plate 27 decreases and since the voltage regulating tubes 32 and 33 are connected between the plate 27 and the grid bias resistor 41 of the triode 34, all the voltage decrease is applied across resistor 41, thereby, producing an amplified voltage decrease on the grid 35 and a corresponding decrease in the current flowing through the cathode resistors 38, 39 and 40. Thus, it is seen, that a slight increase at the grid 13, due to an increase in range, results in a large decrease in the voltage at the tap 43.

Since the voltage at grid 13 has increased and the voltage at tap 43 has decreased, current will flow through the resistor 45 and the speed calibrating resistor 44. Since the only source for this current is from the condenser 11, the charge on condenser 11 will be changed, and due to the large gain of the D.-C. amplifiers 12, 18 and 24, and the current flow through resistors 45 and 44, the voltage at grid 13 is maintained very nearly constant, and the rate of change of charge on condenser 11 is proportional to the rate of change of range voltage applied at the terminals 10. Since the rate of change of charge is current, the current through resistors 45 and 44 is proportional to velocity. It follows then, that since the current flowing through resistors 45 and 44 is proportional to the voltage thereacross, the voltages at the tap 43 and at the cathode 37 are proportional to velocity as long as the current through resistors 45 and 44 is very much smaller than the current through triode 34. This is readily accomplished by providing a large resistor 45. The voltage appearing across the output resistor 42 is, therefore, representative of velocity, and it is seen that an increase in range causes a negative velocity voltage, while a decrease in range causes a positive velocity voltage. The position of the tap 43 on the resistor 39 may be adjusted to obtain a zero voltage output for zero range input, while the resistor 44 may be adjusted to permit more accurate speed readings for various speed ranges.

Thus, an accurate, reliable and simple system for determining closing and opening speeds from range signals has been provided.

While there has been described a simplified form of what is considered a preferred embodiment of this invention, it will be obvious to those skilled in the art that various changes and modifications may be made without departing from the invention, and it is aimed, therefore, to cover all such changes and modifications as fall within the spirit of this invention and the scope of the appended claim.

What is claimed is:

A system for converting a varying direct current range signal into a signal proportional to relative velocity comprising: first and second input terminals, said first terminal being adapted to be connected to receive said range signal and said second terminal being connected to ground; a first triode having a plate connected through a first plate resistor to a positive terminal of a direct current source, a cathode connected to ground, and a control grid; a second triode having a plate connected through a second plate resistor to said posiitve terminal, a cathode connected to ground, and a control grid connected through a first biasing resistor to a negative terminal of said direct current source and through a grid leak condenser to ground; a third triode having a plate connected through a third plate resistor to said positive terminal, a cathode connected to ground, and a control grid connected through a second biasing resistor to said negative terminal; a fourth triode having a plate connected directly to said positive terminal, a cathode connected through a cathode circuit to said negative terminal, said cathode circuit comprising a fixed resistor in series with a resistor having a variable tap, and a control grid connected through a third biasing resistor to said negative terminal; a condenser coupling said first input terminal to the grid of said first triode; a first coupling resistor coupling the plate of said first triode to the control grid of said second triode; a second coupling resistor coupling the plate of said second triode to the control grid of said third triode; a pair of series connected voltage regulator tubes coupling the plate of said third triode to the control grid of said fourth triode whereby all of the voltage on the plate of said third triode is applied across said third biasing resistor; an output terminal connected to the cathode of said fourth triode; an output resistor connected between said output terminal and said negative terminal; a feedback circuit, in which the current flow is very small compared to the current flow through said fourth triode, connected between said variable tap and the control grid of said first triode, said feedback circuit comprising a fixed resistor connected in series with a variable resistor, the resistance of said feedback circuit being very large in comparison to the resistance of said cathode circuit; whereby the voltage at said last mentioned control grid is maintained substantially constant and the voltage at said output terminal is proportional to velocity; said variable tap of said cathode circuit being positioned to obtain a zero voltage at said output terminal when said range signal is zero, a negative velocity voltage at said output terminal when there is an increase in said range signal, and a positive velocity voltage at said output terminal when there is a decrease in said range signal.

References Cited in the file of this patent
UNITED STATES PATENTS

| | | |
|---|---|---|
| 2,412,227 | Och et al. | Dec. 10, 1946 |
| 2,506,770 | Braden | May 9, 1950 |
| 2,607,528 | McWhirter | Aug. 19, 1952 |
| 2,651,719 | White | Sept. 8, 1953 |